United States Patent Office 3,362,679
Patented Jan. 9, 1968

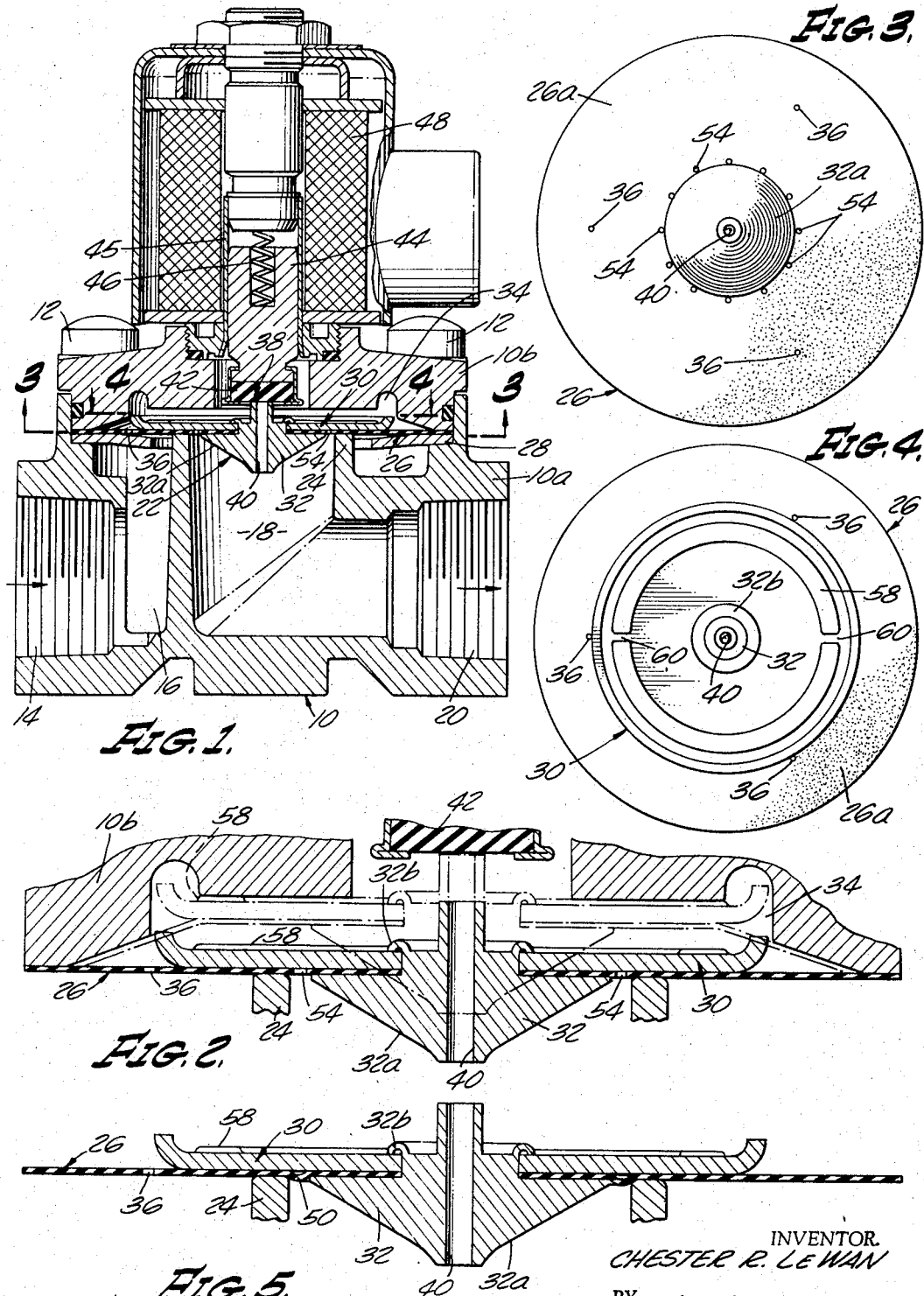

3,362,679
VALVE DIAPHRAGM WITH PRESSURE RELIEF HOLES
Chester R. Le Wan, La Crescenta, Calif., assignor to International Telephone and Telegraph Corporation, New York, N.Y., a corporation of Maryland
Filed Apr. 29, 1966, Ser. No. 546,394
5 Claims. (Cl. 251—38)

ABSTRACT OF THE DISCLOSURE

The disclosure is drawn to a pilot operated diaphragm valve. The diaphragm has small openings in the area immediately adjacent the valve seat in a diaphragm area which covers the outlet chamber. The holes bleed off fluid trapped between the diaphragm and a backup plate when high pressure fluid flows around the backup plate and closes the main valve.

---

This invention relates to diaphragm type valve constructions, and more particularly to a means for lengthening the life of the valve diaphragm.

Flexible diaphragms have long been commonly used in the construction of a variety of valves in view of the versatile capabilities of a diaphragm which permits it to be pressure responsive and at the same time to be easily sealed so as to form a wall of a pressure chamber. However, the very flexibility which makes the diaphragm a desirable valve element also points out a weakness of such valve elements in that the constant flexing of a diaphragm under pressure commonly causes the diaphragm to become one of the first elements in such a valve to fail. This difficulty is, of course, compounded when there are usually high pressures across portions of the diaphragm.

It is a primary object of this invention to increase the life of a diaphragm in a valve construction by uniquely decreasing the pressure to which prior art valves of this nature have been subjected.

It is a further object of this invention to provide a diaphragm valve construction in which undesirable stresses in the area of the diaphragm adjacent the valve seat are eliminated.

It is a further object of the invention to provide a unique diaphragm valve construction in which the pressure across the annular operating portion of the diaphragm surrounding the valve seat is significantly minimized.

In one common type of diaphragm valve construction, there is provided a valve body having an annular inlet chamber surrounding an annular main valve seat leading to an outlet chamber. A flexible diaphragm mounted in the valve body carries a valve member which cooperates with the valve seat to control fluid flow through the valve as the diaphragm portion within the valve member forms a wall of the outlet chamber and the annular diaphragm portion surrounding the valve member forms a wall of the inlet chamber. Restricted apertures in the annular diaphragm portion permit fluid flow from the inlet chamber to a control chamber on the opposite side of the diaphragm. A diaphragm plate having a diameter greater than the seat diameter is centrally secured to the diaphragm in the control chamber to support the diaphragm as the valve member engages the seat. A pilot valve port centrally formed in the diaphragm and the plate permits fluid from the control chamber to flow into the outlet chamber, thereby decreasing the pressure in the control chamber and allowing the inlet pressure to move the diaphragm to open the main valve. The pilot valve port is opened or closed by a pilot valve member externally controlled.

It has been found that as the diaphragm is moved from a valve open to a valve closed position, a certain amount of fluid is trapped between the diaphragm plate and the diaphragm in the area between the main valve seat and the means securing the plate to the diaphragm. This trapped fluid forms a high pressure chamber which causes great stress on the diaphragm in this area. In accordance with the invention, this pressure is relieved by forming one or more small holes in the diaphragm, thus allowing the fluid to drain harmlessly into the outlet chamber.

Another problem with valve construction of this nature is that high stresses are produced in the working area of the diaphragm surrounding the valve seat and the diaphragm plate when the main valve is open. This annular area not being backed by the diaphragm plate receives most of the normal flexing action of the diaphragm. As explained, the main valve is held in open position by the inlet pressure so long as the pilot valve is held open to prevent the establishment of a higher pressure in the control chamber. Consequently, the usual practice for prior art valves of this nature, was to have the entire control chamber in essentially unrestricted communication with the pilot valve port. As a result, the control chamber tended to approach the pressure in the outlet chamber. Since the area of the diaphragm exposed to the inlet chamber was receiving a pressure much higher than outlet pressure, this area of the diaphragm was subjected to a considerable pressure differential across the diaphragm. In accordance with another aspect of the invention, this pressure differential has been significantly reduced by restricting the flow of fluid from the area of the control chamber surrounding the diaphragm plate to the central portion of the control chamber which is open to the pilot valve. Thus, by properly controlling the flow of fluid from the control chamber, the pressure in that annular area can be held close to the inlet pressure while still maintaining the main valve in an open position. In this fashion, the pressure across the diaphragm is substantially reduced and the resulting reduction of stress on the diaphragm significantly lengthens the useful life of the diaphragm.

For a more detailed description of the invention refer now to the following specification and drawing in which:

FIG. 1 is a cross-sectional view of a valve embodying the improved diaphragm construction of the invention;

FIG. 2 is an enlarged view of the diaphragm portion of the valve shown in FIG. 1;

FIG. 3 is a view of FIG. 2 along 3—3;

FIG. 4 is a view of FIG. 2 along 4—4; and

FIG. 5 is a cross-sectional view of a diaphragm construction not having one of the unique features of the invention.

The valve construction illustrated in FIG. 1 includes a valve body 10 having a lower section 10a and an upper section 10b clamped together by suitable fasteners 12. An inlet connection 14 leads to annular inlet chamber 16 which surrounds an outlet chamber 18 leading to an outlet connection 20. A main valve 22 controls the flow of fluid from the inlet chamber to the outlet chamber and includes a circular valve seat 24 which forms a common wall of inlet and outlet chambers 16 and 18. A flexible diaphragm 26 is clamped, together with an annular supporting member 28, between the valve body sections 10a and 10b to form a movable valve member which cooperates with the fixed valve seat 24. As can be seen, the outer portion of diaphragm 26 forms an annular wall of inlet pressure chamber 16 and the central portion of diaphragm 26 forms a part of a top wall to outlet pressure chamber 18.

A rigid diaphragm plate 30 is secured to diaphragm 26 by fastening member 32 which extends through the center of plate 30 and diaphragm 26. The fastener member 32 is illustrated as having a somewhat conically shaped portion 32a on the bottom side of the diaphragm extending outwardly to engage and reinforce the lower surface of the diaphragm. The upper portion of the fastener 32 extends through the diaphragm and the diaphragm plate and is flared outwardly to form a flange 32b which engages the upper surface of the diaphragm plate to thereby securely hold the plate to the diaphragm at their center sections. As can be seen, the conical portion of the fastener 32 extends outwardly almost to the annular valve seat 24 but normal manufacturing tolerances cause it to be slightly radially spaced from the valve seat. The diaphragm plate 30 has a diameter somewhat larger than that of valve seat 24 so that the diaphragm is firmly supported by the rigid plate in the area of the diaphragm which engages the valve seat.

The upper side of diaphragm 26 together with the diaphragm plate 32 forms a wall of control chamber 34 in cooperation with the adjacent housing section 10b. A plurality of restricted apertures 36 are formed in the annular section 26a of diaphragm 26, perhaps best seen in FIG. 4, to transmit fluid from inlet chamber 16 to control 34. In the absence of restricted apertures 36, the inlet pressure in chamber 16 would normally hold the main valve 22 in an open position, however, with the apertures 36, the main valve is normally held in a closed position as the pressure in control chamber 34 equals or approaches that of the pressure in chamber 36 since the effective area of diaphragm 26 exposed to the control chamber 34 is greater than the area of the diaphragm exposed to inlet chamber 16.

To provide control over the main valve 22, there is employed a pilot valve 38 comprising a port 40 extending through fastening member 32 and a valve element 42 carried on the end of an axially movable plunger 44 slidably positioned within cylinder 45. The plunger 44 is normally urged downwardly by a spring 46, but is movable upwardly by the actuation of solenoid structure 48 mounted on the valve body 10.

To operate the pilot valve, the solenoid structure 48 is energized causing plunger 44 to be moved upwardly thereby moving valve element 42 away from port 40 thus opening the pilot valve 38. This action quickly reduces the pressure within chamber 34 since the port is open to outlet pressure chamber 18 and the flow rate through port 40 is considerably greater than the combined flow rate through restricted apertures 36. Consequently, the inlet pressure reacting on the lower annular surface 26a of the diaphragm forces the main valve 22 to open position. Correspondingly, to close the main valve, it is only necessary to deenergize solenoid structure 48 permitting plunger 44 to move downwardly closing port valve 32 and thereby causing a pressure increase within chamber 34 which closes the main valve.

To increase the life of the diaphragm, it is desirable to minimize the stresses to which the diaphragm is subjected by preventing great pressure differentials across any section. It has been found that a certain amount of fluid normally exists between the upper surface of diaphragm 26 and the lower surface of diaphragm plate 30 when the valve is in the open position. As the valve is closing, most of this fluid is forced outwardly, but a small portion is frequently trapped between the plate and the diaphragm in the area of the diaphragm extending between the fixed valve seat 24 and the fastener member 32. Since the pressure within control chamber 34 has increased, when the main valve is closed, this trapped fluid is at a pressure considerably higher than that on the opposite side of the diaphragm which is exposed to outlet pressure chamber 18, and the closing action further increases the pressure on the fluid. As seen from the prior art structure of FIG. 5, this trapped high pressure fluid forces an annular section 50 of the diaphragm downwardly towards the outlet chamber 18 forming an annular space or pocket 52. It has been found that the resulting stress introduced to the diaphragm has caused early failure of the diaphragm material in this area.

In accordance with this invention, it was found that this condition could be simply, but uniquely relieved by forming bleed means such as an annular series of holes 54 in the diaphragm in this area as seen in FIGS. 1–3. The holes 54 permit the trapped fluid to simply drain into the outlet chamber 18. Since this area of the diaphragm is backed by the rigid diaphragm plate 30, the holes 54 do not cause any undesirable weakening of the diaphragm structure.

As a remarkable example, of the effectiveness of the bleed means 54, tests have revealed that for a particular diaphragm construction, the effective life of the diaphragm material has been increased from eight to ten times that of the diaphragm without the bleed means. Hence, the value of this improvement in terms of cost saving and reliability can be readily appreciated.

Another area in which undesirable stresses have been introduced in prior art constructions is in the outer annular section of diaphragm 26 which forms a wall of the inlet chamber 16. In order to hold the main valve 22 open, it is, of course, necessary that the high pressure fluid entering chamber 34 through restricted apertures 36, be dissipated through pilot valve port 40. Also, to close the main valve the downward force produced by pressure in chamber 34 should increase rapidly when the pilot valve is closed. Hence, in usual prior art arrangements the valve body forming a wall of the control chamber or the diaphragm plate are suitably formed to insure open communication between the outer portion of the control chamber and the central portion. Consequently, the control chamber pressure tends to approach the outlet pressure in such constructions, with the result that the outer portion of the diaphragm is subjected to inlet pressure on one side and essentially outlet pressure on its other side. This pressure differential causes great stress on the diaphragm which greatly shortens its life.

In accordance with the invention, this stress has been greatly reduced by restricting or limiting the flow rate between the outer and inner portions of chamber 34 so that the outer portion is maintained at a higher pressure. The upper surface of plate 30 is formed with an annular raised surface 58 which seats against the adjacent surface of valve body 10b, as indicated by dotted lines in FIG. 3. If uninterrupted, this raised surface 58 would prevent the fluid entering through aperture 36 from reaching the central portion of chamber 34. Consequently, the main valve could not be closed by closing the pilot valve. By forming restricted passages 60 in the surface 58, the rate of fluid flow to the inner portion of chamber 34 is controlled so that the diaphragm can be closed when desired, but yet the pressure in the outer portion of the control chamber is maintained at a pressure closer to inlet pressure than if unrestricted flow were permitted.

To attain any pressure increase in the outer portion of chamber 34, the combined flow rate of passages 60 must be smaller than that of apertures 36, but yet the rate through passages 60 must be large enough to cause a rapid pressure increase in control chamber 34 when the pilot valve 38 is closed. It should be realized that by maintaining the outer portion of chamber 34 at an elevated pressure, the overall pressure of chamber 34 does not have to be increased as much when the pilot valve is closed. Hence, to that extent, a valve employing the construction of the invention would close more rapidly than one of conventional construction.

The radial location of annular surface 58 must also be considered to insure proper operation of the valve. By locating the annular surface 58 radially outward from valve seat 24, the effective diaphragm area exposed to inlet chamber 16 is kept greater than that exposed to the portion of chamber 34 outward from surface 58. In other words, if the annular surface 58 were moved radially inward, at some point within the circle defined by valve seat 24, main valve 22 would be closed as the pressure in the outer portion of chamber 34 approached inlet pressure even though pilot valve 38 were still held in an open position.

As an example of the pressures involved in a typical situation, the inlet pressure might be at 150 p.s.i.g. and the outlet pressure at 40 p.s.i.g. with the main valve open. Thus, without the improvement of the invention, the pressure drop across the diaphragm would be 110 p.s.i. By incorporating the restricted passages 60 of the invention, the pressure in the unsupported outer portion of the diaphragm can be easily raised to a pressure in excess of 110 to 120 p.s.i., thus reducing the stress across the valve a significant amount.

In view of the foregoing, it can be seen that the useful life of a diaphragm in a valve construction can be simply increased by incorporating the teachings of the invention. While a specific embodiment has been disclosed, it is intended that all variations and modifications that fall within the true spirit and scope of the invention be included in the appended claims.

What is claimed is:

1. A diaphragm valve construction comprising: a valve body having means defining an annular inlet chamber, an outlet chamber within said inlet chamber, and a main valve controlling the flow of fluid from the inlet chamber to the outlet chamber;
    said valve including an annular valve seat forming a common wall of said chambers and a flexible diaphragm mounted in said body forming a movable valve member cooperating with said valve seat and the lower side of the diaphragm forming an annular wall of said inlet chamber and a top wall of said outlet chamber;
    means defining a control pressure chamber with the top side of said diaphragm forming a wall of the control chamber;
    a rigid diaphragm plate, means for centrally securing the plate to said diaphragm on the top side of the diaphragm, said plate having a diameter at least as large as said valve seat, but smaller than said diaphragm so that the plate is spaced from the surrounding valve body;
    restricted aperture means formed in said valve construction for transmitting inlet pressure to said control chamber for closing said main valve;
    a pilot valve including a port formed in the central portion of said diaphragm and a movable valve element for controlling the fluid flow through said port, said port having a flow capacity greater than said aperture means so that when said pilot valve is open the pressure in said control chamber is reduced with the result that the pressure in the inlet chamber moves said diaphragm to open said main valve; and
    bleed means for reducing stress on said diaphragm in the annular area between the valve seat and said securing means, said bleed means serving to permit any liquid trapped between the plate and the diaphragm to drain into said outlet chamber thereby preventing a pressure buildup and resulting stress on the diaphragm in that area.

2. The invention of claim 1 in which the means securing the diaphragm to the plate comprises a member extending axially through the plate and the diaphragm and includes means extending radially outward adjacent the plate and the opposite side of the diaphragm to clamp the plate and the diaphragm together.

3. The invention of claim 2 in which said pilot valve port extends through said member.

4. The invention of claim 1 in which said bleed means includes a ring of spaced holes.

5. The invention of claim 1 including means for reducing stress across said diaphragm when said main valve is open comprising an annular surface formed on the side of said plate remote from the diaphragm which seats against the adjacent surface of said valve body when the valve is open, and restricted passage means to permit limited fluid flow across the said annular surface at a rate less than the flow rate through said restricted aperture means so that the pressure drop across the portion of said diaphragm radially outward from said plate is considerably less than the drop between said inlet and outlet chambers.

References Cited

UNITED STATES PATENTS

| | | | |
|---|---|---|---|
| 2,305,151 | 12/1942 | Fields | 251—38 |
| 2,826,367 | 3/1958 | Cobb | 251—30 X |
| 3,103,338 | 9/1963 | Marmo | 251—45 |

M. CARY NELSON, *Primary Examiner.*

ARNOLD ROSENTHAL, *Examiner.*